United States Patent [19]

Guenon

[11] 4,326,828
[45] Apr. 27, 1982

[54] BALE WAGONS

[75] Inventor: Jean-Pierre Guenon, Plombières-les-Dijon, France

[73] Assignee: Sperry Corporation, New Holland, Pa.

[21] Appl. No.: 179,901

[22] Filed: Aug. 20, 1980

[30] Foreign Application Priority Data

Aug. 25, 1979 [GB] United Kingdom ............... 29690/79

[51] Int. Cl.³ ...................... A01D 87/12; B65G 57/32
[52] U.S. Cl. ........................................ 414/39; 414/554
[58] Field of Search ...................... 414/38, 39, 40, 44, 414/111, 554

[56] References Cited

U.S. PATENT DOCUMENTS

| | | | |
|---|---|---|---|
| 3,289,859 | 12/1966 | Tarbox | 414/40 |
| 3,549,023 | 12/1970 | Backman | 414/44 X |
| 3,664,519 | 5/1972 | Grey | 414/40 |
| 3,687,302 | 8/1972 | Castro | 414/40 |
| 4,095,701 | 6/1978 | Guenon | 414/39 |
| 4,119,218 | 10/1978 | Guenon et al. | 414/39 |

FOREIGN PATENT DOCUMENTS

| | | | |
|---|---|---|---|
| 2333922 | 5/1977 | France | |
| 2028261 | 3/1980 | United Kingdom | |
| 376051 | 5/1973 | U.S.S.R. | 414/39 |
| 483957 | 12/1975 | U.S.S.R. | 414/40 |

Primary Examiner—Leslie J. Paperner
Attorney, Agent, or Firm—Larry W. Miller; Frank A. Seemar

[57] ABSTRACT

In a bale wagon having a bale receiving table onto which bales are lifted from the ground by pick-up means, a transfer table to which the bales are transferred from the receiving table and a load bed onto which tiers of bales are transferred by pivotal movement of the transfer table from a bale loading position to a bale unloading position there is provided bale retaining apparatus in the form of spikes or sprags which project upwardly through apertures in the load bed when the transfer table is in the bale loading position to prevent the lowermost bale or bales of the foremost tier of bales from slipping on the load bed. When the transfer table moves to the bale unloading position, the spikes or sprags are automatically retracted below the load bed, enabling the stack of bales on the load bed to be moved rearwardly to accommodate the next tier of bales.

3 Claims, 3 Drawing Figures

BALE WAGONS

BACKGROUND OF THE INVENTION

This invention relates to bale wagons of the form having tables movable to transfer tiers of bales from the tables on to load beds on which the accumulated tiers form stacks of bales. More specifically, this invention deals with apparatus which permits the bale wagon to form compact, stable stacks of bales on the load bed under sidehill and hilly operating conditions.

In such bale wagons bales are pickd up from the ground and placed on a bale receiving table to form a layer. A complete layer is transferred to a transfer table by pivotal movement of the receiving table and subsequent layers are added to the transfer table to form a tier of bales. The tier of bales is then transferred to the load bed by pivotal movement of the transfer table. One such bale wagon is disclosed in U.S. Pat. No. 4,119,218, issued Oct. 10, 1978, which discusses the problems experienced in maintaining the bales of the foremost tier, i.e. the bales of the tier most recently transferred to the load bed, in a stable condition on the load bed. This problem, which is particularly marked when the bale wagon is working on uneven or hilly terrain, has been addressed by providing bale retaining fingers which rest on the top bales of the foremost tier. The added weight imparted to the foremost tier of bales by the bale retaining fingers has lessened somewhat the likelihood of the bales bowing or slipping one on the next, but has not prevented the lowermost bales of the foremost tier slipping longitudinally on the load bed. The load bed is normally made of a smooth surfaced metal. Such slippage inevitably causes the stack of bales to be less compact and may even cause the tier to slip completely off the load bed, resulting in disruption to the automatic operation of the bale wagon.

This problem is solved, according to the present invention, by a bale wagon comprising bale pick-up means for lifting bales from the ground, a table on to which the lifted bales are transferred, a load bed, the table being movable between a bale loading position and a bale unloading position, in which latter position bales are transferred to the load bed to form a stack of bales comprising a plurality of tiers of bales, and bale retaining means movable between an operative position in which the retaining means engage the underside of each of the lowermost bales of the foremost tier on the load bed, and an inoperative position clear of the underside of the lowermost bales, the bale retaining means occupying the operative position when the table is in the bale loading position and the inoperative position when the table is in the bale unloading position.

SUMMARY OF THE INVENTION

It is a principal object of the present invention to provide in a bale wagon bale retaining means which engage the tier of bales most recently transferred to the load bed to prevent the lowermost bales of the most recently transferred tier from slipping longitudinally along the load bed surface.

It is another object of the present invention to provide a simple, low cost way of retaining the lowermost tier of bales in position on the bale wagon load bed.

It is a feature of the present invention that a plurality of spikes or sprags project upwardly through suitable apertures in the load bed when in the operative position to penetrate each of the lowermost bales in the most recently transferred tier and hold these bales securely in position, especially during sidehill operations.

It is another feature of the present invention that the plurality of spikes or sprags are withdrawn beneath the apertures in the load bed in the inoperative position so as to not engage the lowermost bales of the most recently transferred tier of bales.

It is an advantage of the present invention that slippage of the bottommost bales in the most recently transferred tier of bales is avoided.

It is another advantage of the present invention that the stack of bales formed on the load bed during sidehill operations is compact.

It is a further advantage of the present invention that there is no disruption to the automatic operation of the bale wagon due to slippage of bales on the load bed during sidehill operations.

These and other objects, features and advantages are obtained by providing in a bale wagon bale retaining means which extend through the forwardmost part of the load bed to engage the bottommost row of bales in the most recently transferred tier of bales to securely hold the stack of bales being formed in position, especially during sidehill operations, thereby ensuring a compact stack of bales.

BRIEF DESCRIPTION OF THE DRAWINGS

The objects, features and advantages of the invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
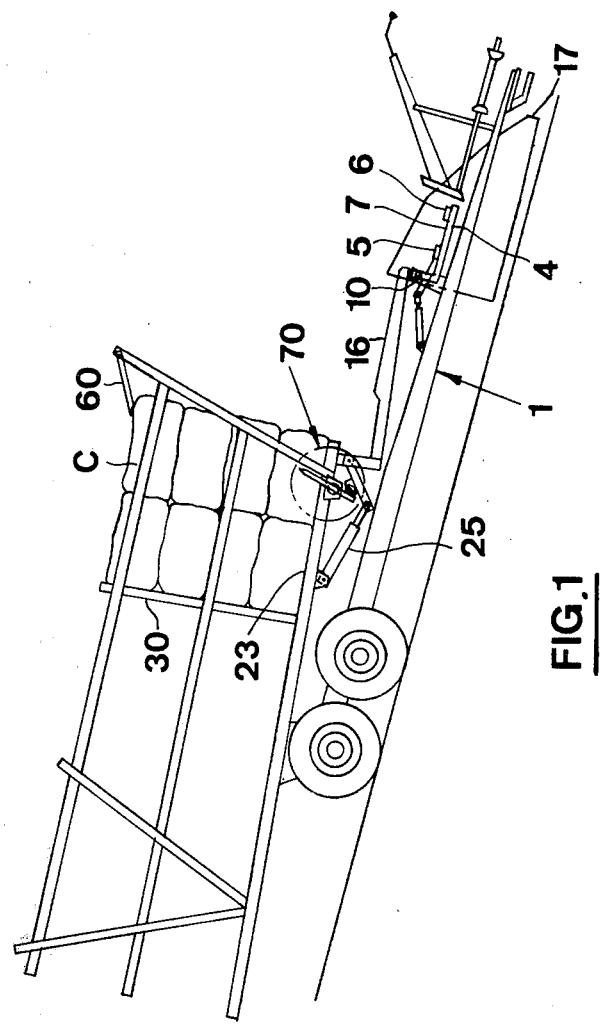
FIG. 1 is an elevation of one side of the bale wagon.

Refering to FIG. 1, the components bearing reference numerals 60 or below correspond to the components bearing the similar reference numerals shown in U.S. Pat. No. 4,119,218, issued Oct. 10, 1978 and assigned to the assignee of the present invention. Briefly, the bale wagon shown in FIG. 1 comprises a chassis 1 at the forward end of which is mounted a bale receiving table 4 comprising two transversely extending beams 5 and 6 which are mounted on a forwardly extending horizontal portion 7 of an L-shaped structure. Bales of crop material are picked up from the ground by pick-up means 17 and lifted onto the receiving table 4 which is pivotally mounted about a horizontal pivot axis to enable it to swing counterclockwise (as viewed in FIG. 1) in order to transfer the bales onto a transfer table 16, and then to swing clockwise so as to revert to the position shown in FIG. 1.

When the requisite number of bales has been accumulated on the transfer table 16 from the receiving table 4 to form a first tier of bales on the table 16, a hydraulic actuator 25 (FIG. 2) is operated by trip means (not shown) so that the actuator 25 extends and causes the table 16 to swing upwardly about its horizontal pivot axis 21 through approximately 90°. In this manner the first tier of bales formed on the transfer table 16 is transferred from a generally horizontal position on the table 16 to a generally vertical position on a platform assembly 29 of a load bed 23 against a rolling rack 30 which is thus forced rearwardly. Successive tiers of bales placed on the load bed 23 by the table 16 will effect further rearward movement of the rack 30 relative to the load bed 23.

Bale retaining fingers 60 rest on the foremost tier C of bales on the load bed 23 and help to prevent one bale slipping on the next. The load bed 23 is of metal and, in accordance with the invention, bale retaining means 70 are provided in order to retain the lowest or bottommost bales of the foremost tier C when the transfer table 16 is in the bale loading position shown in FIG. 2.

Figure 2:
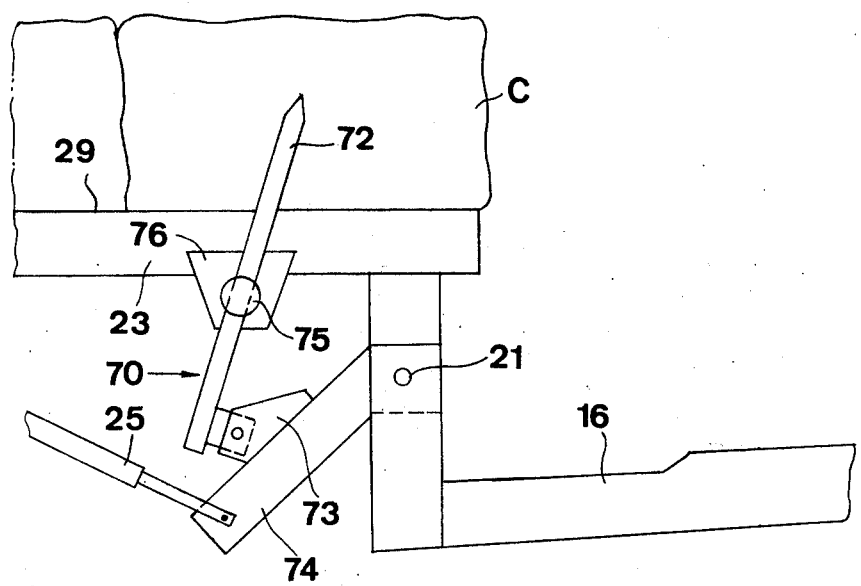
FIG. 2 is an enlarged sectional view of the circled area in FIG. 1 and shows bale retaining means of the bale wagon in an operative position.

The bale retaining means 70 comprise a plurality of metal spikes or sprags 72 one end of each of which is pointed and the other end of which is pivotally mounted on a bracket 73 rigidly secured to an angled extension flange 74 welded to the table 16. As shown in FIG. 2, the piston end of the hydraulic actuator 25 is connected to the flange 74.

Figure 3:
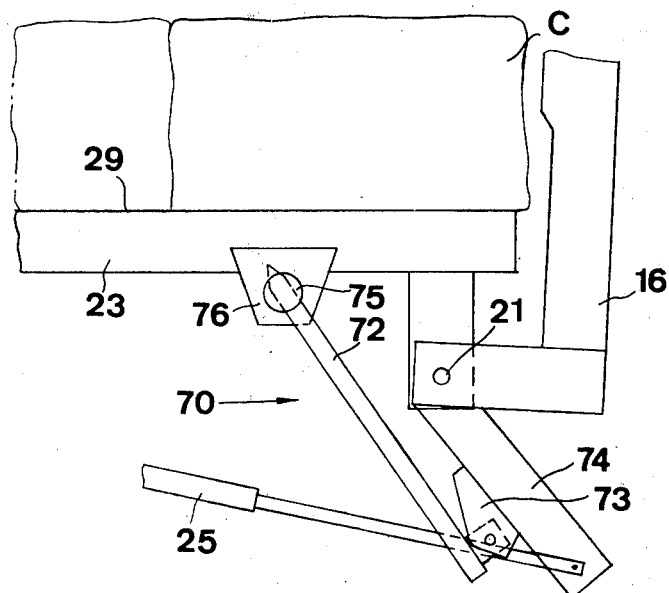
FIG. 3 is a view similar to that of FIG. 2, but showing the bale retaining means in an inoperative position.

The number of spikes or sprags 72 can be chosen to suit the particular bale wagon, but in the particular embodiment illustrated in the drawings there are four such spikes or sprags evenly spaced in a lateral direction perpendicular to the plane of FIG. 2 or FIG. 3. Since each tier is two bales wide in the present embodiment, each of the two lowermost bales at the foremost end of the load bed 23 is engaged by two spikes or spargs 72 in the operative position of the bale retaining means shown in FIG. 2. Each spike or sprag projects through a corresponding aperture formed in the load bed 23 and is received for sliding movement within a guide 75 pivotally mounted about a horizontal axis within a bracket 76 rigidly attached to the underside of the load bed 23. Each aperture may be longitudinally elongated so that the front of the platform assembly 29 is of slatted appearance.

Comparison of FIGS. 2 and 3 will reveal that when the transfer table 16 is in the bale loading position (FIG. 2) the sprags or spikes 72 are in their operative positions and project through the apertures and penetrate the lowest bales of the foremost tier C in order to prevent these bales from slipping on the metal load bed. In this operative position, the sprags or spikes 72 project upwardly and forwardly. When the transfer table 16 is swung to the bale unloading position (FIG. 3), the spikes or sprags 72 move with the table 16, sliding through the guides 75, until they reach the inoperative positions in which they project upwardly and rearwardly towards the underside of the load bed, allowing the bales on the load bed to be displaced rearwardly to accommodate the tier of bales newly transferred to the load bed 23 by the table 16.

In operation, the bale wagon is pulled across a field on which have been deposited bales of crop material. The pick-up means 17 picks up the bales from the ground and lifts them onto the bale receiving table 4. When the desired number of bales have been transferred to the receiving table 4, the bales are transferred to the transfer table 16 by the pivotal movement of the receiving table 4. When the required number of bales have been accumulated on the transfer table 16 to form a tier of bales, hydraulic actuator 25 is tapped, thereby causing table 16 to swing upwardly and transfer the tier of bales from a generally horizontal position to a generally vertical position on the platform assembly 29 of the load bed 23 against rolling rack 30. This operation is repeated until the load bed is full.

When a tier of bales is transferred to load bed 23, metal spikes or sprags 72 extend through appropriate apertures into guides 75 by the action of the hydraulic actuators 25 upon flange 74 and then bracket 73. Two spikes or sprags 72 per bale at the bottom of the tier engage each bale to retain the tier in position during operation. Each spike or sprag 72 can slide within guide 75. In this position the spikes or sprags are in the operative position, projecting upwardly and forwardly.

When the bale transfer table is swung to the bale unloading position shown in FIG. 3, the spikes or sprags 72 move with the table 16 sliding through guides 75, until they reach the inoperative position. In this position they project upwardly and rearwardly towards the underside of the load bed, allowing the bales thereon to be moved rearwardly to permit the next tier of bales to be transferred from table 16 to the load bed.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details materials and arrangements of parts which will occur to one of ordinary skill in the art upon a reading of this disclosure.

Having thus described the invention what is claimed is:

1. In a bale wagon having a frame, a bale pickup means mounted on said frame for lifting bales from the ground; a bale receiving table mounted on said frame adjacent said bale pickup means onto which the lifted bales are transferred; said bale receiving table being moveable between a first bale loading position and a second bale unloading position; a load bed mounted on said frame adjacent said bale receiving table for receiving bales from said bale receiving table, said bale receiving table being operable to sequentially transfer a number of bales formed in a tier onto said load bed to form a stack of a plurality of tiers thereon, the improvement comprising:

bale retaining spikes moveable between a first operative position in which the bale retaining spikes project upwardly through apertures in the load bed to penetrate the underside of each of the lowermost bales of the tier of bales last transferred to the load bed by the bale receiving table and a second inoperative position where the bale retaining spikes are withdrawn beneath said apertures;

slides mounted on the underside of the load bed proximate to said apertures for guiding the bale retaining spikes for sliding movement; and linkage means between the bale receiving the table and the bale retaining spikes so that movement of the bale retaining spikes relative to the slides and to the load bed occurs with movement of the bale receiving table, such that the bale retaining spikes are in the first operative position when the bale receiving table is in said first bale loading position and in the second operative position when the bale receiving table is in said second bale unloading position.

2. The bale wagon according to claim 1 wherein said slides are pivotally mounted on the underside of said load bed, said linkage means being pivotally connected to said bale retaining spikes, such that said spikes project upwardly and forwardly in said first operative position and upwardly and rearwardly in said second inoperative position.

3. A bale wagon according to claim 2 wherein bale retaining fingers are provided to rest on the top of the last transferred tier of bales on the load bed.

* * * * *